(12) United States Patent
Wang et al.

(10) Patent No.: US 9,268,605 B2
(45) Date of Patent: Feb. 23, 2016

(54) MECHANISM FOR FACILITATING SLIDING WINDOW RESOURCE TRACKING IN MESSAGE QUEUES FOR FAIR MANAGEMENT OF RESOURCES FOR APPLICATION SERVERS IN AN ON-DEMAND SERVICES ENVIRONMENT

(71) Applicant: salesforce.com,inc., San Francisco, CA (US)

(72) Inventors: Xiaodan Wang, Dublin, CA (US); Vijayanth Devadhar, Fremont, CA (US); Praveen Murugesan, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 240 days.

(21) Appl. No.: 13/841,713

(22) Filed: Mar. 15, 2013

(65) Prior Publication Data

US 2014/0075446 A1  Mar. 13, 2014

Related U.S. Application Data

(60) Provisional application No. 61/708,283, filed on Oct. 1, 2012, provisional application No. 61/711,837, filed (Continued)

(51) Int. Cl.
*G06F 9/46* (2006.01)
*G06F 15/173* (2006.01)
(Continued)

(52) U.S. Cl.
CPC .............. *G06F 9/50* (2013.01); *G06F 9/5027* (2013.01); *G06Q 30/08* (2013.01); *H04L 43/08* (2013.01); *H04L 47/70* (2013.01); *G06F 2209/508* (2013.01)

(58) Field of Classification Search
None
See application file for complete search history.

(56) References Cited

U.S. PATENT DOCUMENTS 5,577,188 A  11/1996 Zhu
5,608,872 A   3/1997 Schwartz et al.
(Continued)

FOREIGN PATENT DOCUMENTS

EP  1510917  3/2005
GB  2 475 897  6/2011

OTHER PUBLICATIONS

PCT/US2013/045511, Notification of Transmittal of the International Search Report and the Written Opinion of the International Searching Authority, Mailed Date Oct. 9, 2013, 8 Pgs.

(Continued)

*Primary Examiner* — Meng An
*Assistant Examiner* — Bing Zhao
(74) *Attorney, Agent, or Firm* — Blakely Sokoloff Taylor & Zafman LLP

(57) ABSTRACT

In accordance with embodiments, there are provided mechanisms and methods for facilitating sliding window resource tracking in message queues for fair management of resources for application servers in an on-demand services environment. In one embodiment and by way of example, a method includes monitoring, in real-time, in-flight jobs in message queues for incoming jobs from organizations in a distributed environment having application servers in communication over a network, applying local sliding windows to the message queues to estimate wait time associated with each incoming job in a message queue. A local sliding window may include segment of time being monitored in each message queue for estimating the wait time. The method may further include allocating, in real-time, based on the estimated wait time, thread resources to one or more of the incoming jobs associated with the one or more of the organizations.

51 Claims, 9 Drawing Sheets

Related U.S. Application Data on Oct. 10, 2012, provisional application No. 61/709,263, filed on Oct. 3, 2012, provisional application No. 61/700,032, filed on Sep. 12, 2012, provisional application No. 61/700,037, filed on Sep. 12, 2012.

(51) Int. Cl.
  *G06F 9/50* (2006.01)
  *G06Q 30/08* (2012.01)
  *H04L 12/26* (2006.01)
  *H04L 12/911* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,640,339 B1 | 12/2009 | Caronni et al. |
| 7,730,478 B2 | 6/2010 | Weissman |
| 8,504,691 B1 | 8/2013 | Tobler et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0033191 A1 | 2/2003 | Davies et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0183084 A1 | 8/2005 | Cuomo et al. |
| 2005/0223022 A1 | 10/2005 | Weissman et al. |
| 2006/0122927 A1 | 6/2006 | Huberman et al. |
| 2007/0016663 A1 | 1/2007 | Weis |
| 2008/0178187 A1 | 7/2008 | Altshuler et al. |
| 2009/0119080 A1 | 5/2009 | Gray et al. |
| 2009/0164635 A1 | 6/2009 | Denker |
| 2009/0177356 A1 | 7/2009 | Plawecki |
| 2009/0177744 A1 | 7/2009 | Marlow et al. |
| 2009/0201935 A1 | 8/2009 | Hass et al. |
| 2009/0265205 A1 | 10/2009 | Stinchcombe |
| 2010/0049570 A1 | 2/2010 | Li et al. |
| 2010/0103938 A1 | 4/2010 | Musoll et al. |
| 2010/0229218 A1 | 9/2010 | Kumbalimutt et al. |
| 2010/0235887 A1 | 9/2010 | Burch et al. |
| 2011/0131645 A1 | 6/2011 | Johnson et al. |
| 2011/0231457 A1 | 9/2011 | Tager et al. |
| 2011/0296515 A1 | 12/2011 | Krstic et al. |

(56) References Cited

U.S. PATENT DOCUMENTS

| | | |
|---|---|---|
| 2012/0011518 A1 | 1/2012 | Duan et al. |
| 2012/0311153 A1* | 12/2012 | Morgan .................. 709/226 |
| 2013/0024496 A1 | 1/2013 | Krishnan |
| 2013/0262931 A1 | 10/2013 | Siddalingesh |
| 2014/0068620 A1 | 3/2014 | Factor |
| 2014/0075017 A1 | 3/2014 | Wang et al. |
| 2014/0075445 A1 | 3/2014 | Wang et al. |

OTHER PUBLICATIONS

PCT/US2013/045509, Notification of Transmittal of the International Searching Report and the Written Opinion of the International Searching Authority, Mailed Oct. 9, 2013.

PCT International Preliminary Report on Patentability and Written Opinion of the International Searching Authority, International Application No. PCT/US2013/045509 Mailed Mar. 17, 2015, 5 pgs.

Lee, Juong-Sik, Recurrent auctions in e-commerce, Rensslaer Polytechnic Institute, ProQuest Dissertations Publishing 2007, 3299458, 2 pages, downloaded from ProQuestDirect on the Internet on Sep. 21, 2015.

U.S. Appl. No. 13/841588, Non-Final Office Action, Mailed Sep. 23, 2015.

U.S. Appl. No. 13/841489, Non-Final Office Action, Mailed Sep. 30, 2015.

* cited by examiner

MECHANISM FOR FACILITATING SLIDING WINDOW RESOURCE TRACKING IN MESSAGE QUEUES FOR FAIR MANAGEMENT OF RESOURCES FOR APPLICATION SERVERS IN AN ON-DEMAND SERVICES ENVIRONMENT

CLAIM OF PRIORITY

This application claims the benefit of U.S. Provisional Patent Application No. 61/708,283, entitled "System and Method for Allocation of Resources in an On-Demand System" by Xiaodan Wang, et al., filed Oct. 1, 2012, U.S. Provisional Patent Application No. 61/711,837, entitled "System and Method for Auction-Based Multi-Tenant Resource Sharing" by Xiaodan Wang, filed Oct. 10, 2012, U.S. Provisional Patent Application No. 61/709,263, entitled "System and Method for Quorum-Based Coordination of Broker Health" by Xiaodan Wang, et al., filed Oct. 3, 2012, U.S. Provisional Patent Application No. 61/700,032, entitled "Adaptive, Tiered, and Multi-Tenant Routing Framework for Workload Scheduling" by Xiaodan Wang, et al., filed Sep. 12, 2012, U.S. Provisional Patent Application No. 61/700,037, entitled "Sliding Window Resource Tracking in Message Queue" by Xiaodan Wang, et al., filed Sep. 12, 2012, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating sliding window resource tracking in message queues for fair management of resources for application servers in an on-demand services environment.

BACKGROUND

Large-scale cloud platform vendors and service providers receive millions of asynchronous and resource-intensive customer requests each day that make for extremely cumbersome resource allocation and scalability requirements for the service providers. Most customers get frustrated waiting for their request to be fulfilled because none of the conventional techniques provide for any real-time guarantees in responding to such requests. Moreover, multi-tenancy means that multiple users compete for a limited pool of resources, making it even more complex to ensure proper scheduling of resources in a manner that is consistent with customer expectations.

Distributing point of delivery resources, such as application server thread time, equitably among different types of messages has been a challenge, particularly in a multi-tenant on-demand system. A message refers to a unit of work that is performed on an application server. Messages can be grouped into any number of types, such as roughly 300 types, ranging from user facing work such as refreshing a report on the dashboard to internal work, such as deleting unused files. As such, messages exhibit wide variability in the amount of resources they consume including thread time. This can lead to starvation by long running messages, which deprive short messages from receiving their fair share of thread time. When this impacts customer-facing work, such as dashboard or apex futures, customers are likely to dislike and complain when faced with performance degradation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
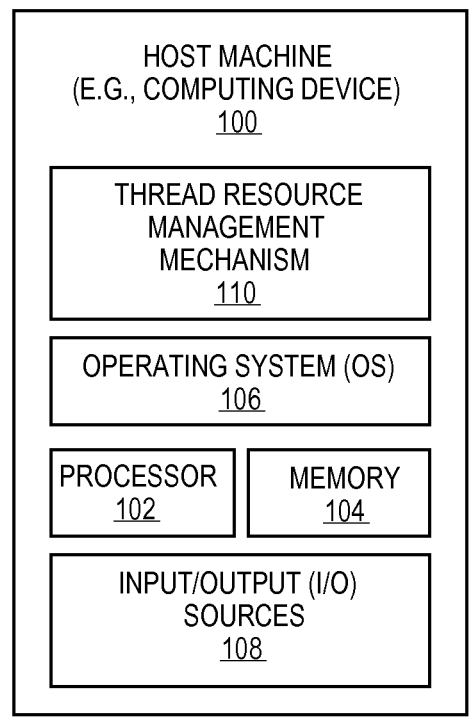
FIG. 1 illustrates a computing device employing a thread resource management mechanism according to one embodiment.

In accordance with embodiments, there are provided mechanisms and methods for facilitating sliding window resource tracking in message queues for fair management of resources for application servers in an on-demand services environment. In one embodiment and by way of example, a method includes monitoring, in real-time, in-flight jobs in message queues for incoming jobs from organizations in a distributed environment having application servers in communication over a network, applying local sliding windows to the message queues to estimate wait time associated with each incoming job in a message queue. A local sliding window may include segment of time being monitored in each message queue for estimating the wait time. The method may further include allocating, in real-time, based on the estimated wait time, thread resources to one or more of the incoming jobs associated with the one or more of the organizations.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating sliding window resource tracking in message queues for fair management of resources for application servers in an on-demand services environment. In one embodiment and by way of example, a method includes monitoring, in real-time, in-flight jobs in message queues for incoming jobs from organizations in a distributed environment having application servers in communication over a network, applying local sliding windows to the message queues to estimate wait time associated with each incoming job in a message queue. A local sliding window may include segment of time being monitored in each message queue for estimating the wait time. The method may further include allocating, in real-time, based on the estimated wait time, thread resources to one or more of the incoming jobs associated with the one or more of the organizations.

Large-scale cloud platform vendors and service providers receive millions of asynchronous and resource-intensive customer requests each day that make for extremely cumbersome resource allocation and scalability requirements for the service providers. Moreover, multi-tenancy means that multiple users compete for a limited pool of resources, making it even more complex to ensure proper scheduling of resources in a manner that is consistent with customer expectations.

Embodiments provide for 1) globally-consistent tracking of resources built on top of the metering framework, 2) sliding window aggregation of statistics with configurable look-back period, 3) added support for minimum/maximum aggregation operations in metering, 4) novel method for estimating queuing time by organization and message type, 5) solution for set-oriented aggregation of non-numeric values in a distributed environment, and 6) solution for tracking thread status of long running messages using memcached distributed cache.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Next, mechanisms and methods for facilitating a mechanism for facilitating sliding window resource tracking in message queues for fair management of resources for application servers in a multi-tenant environment in an on-demand services environment will be described with reference to example embodiments.

FIG. 1 illustrates a computing device 100 employing a thread resource management mechanism 110 according to one embodiment. In one embodiment, computing device 100 serves as a host machine employing a thread resource management mechanism ("resource mechanism") 110 for message queues for facilitating dynamic management of application server thread resources facilitating fair and efficient management of thread resources and their corresponding messages, including their tracking, allocation, routing, etc., for providing better management of system resources as well as promoting user-control and customization of various services typically desired or necessitated by a user (e.g., a company, a corporation, an organization, a business, an agency, an institution, etc.). The user refers to a customer of a service provider (e.g., Salesforce.com) that provides and manages resource mechanism 110 at a host machine, such as computing device 100.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "request" and "message" may be used interchangeably throughout this document.

Figure 2:
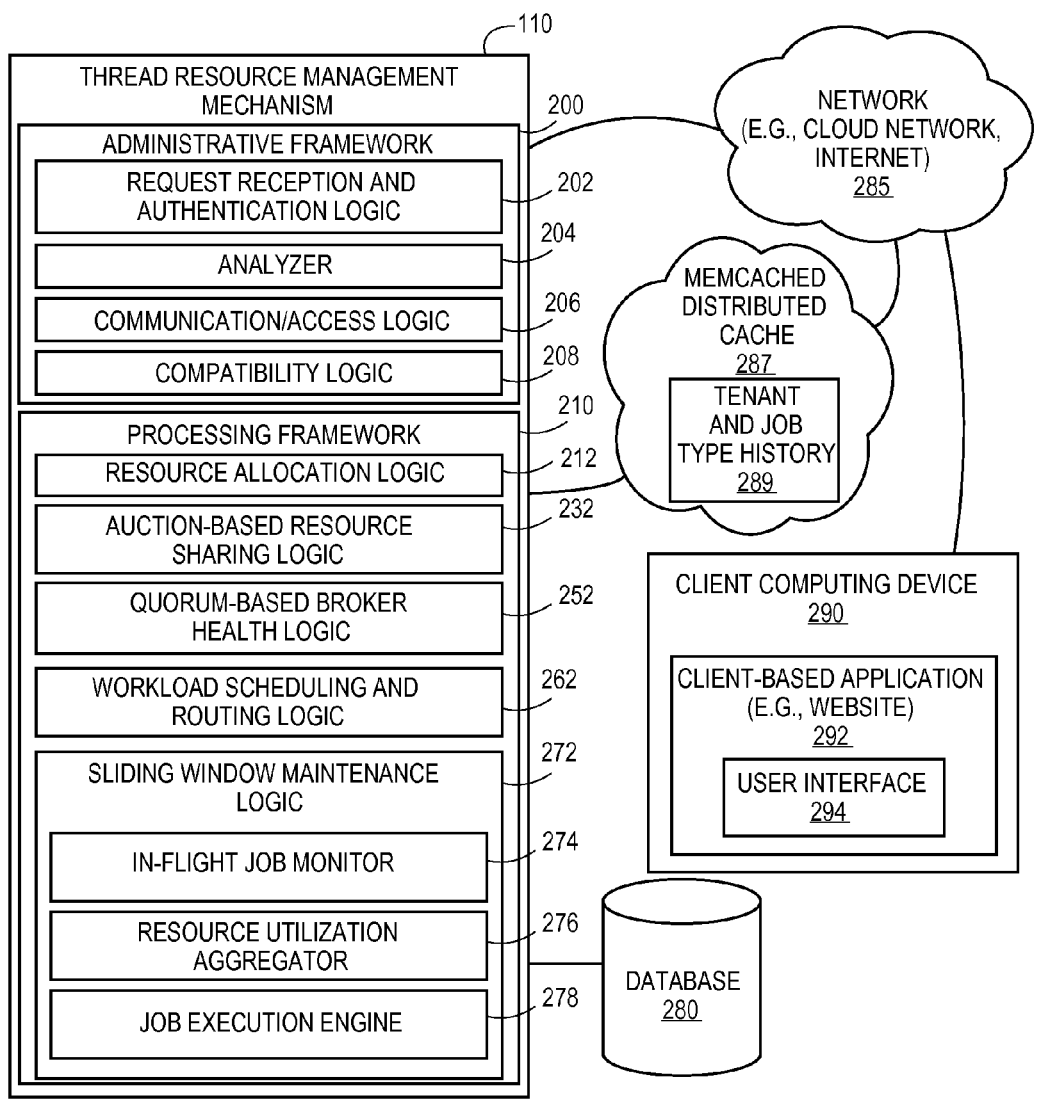
FIG. 2 illustrates a thread resource management mechanism including workload scheduling and routing logic according to one embodiment.

FIG. 2 illustrates a thread resource management mechanism 110 including workload scheduling and routing logic 252 according to one embodiment. In one embodiment, thread resource management mechanism ("resource management") 110 includes sliding window maintenance logic ("window logic") 272 to provide a novel instrumentation for adaptive, tiered, and multitenant routing framework for workload scheduling for routing traffic in a queue infrastructure to facilitate a range of novel, multi-tenant features and further to allow for dynamic allocation of message queue resources and isolate traffic from competing organizations and scale out by sharing messages across multiple brokers.

In the illustrated embodiment, resource mechanism 110 may include various components, such as administrative framework 200 including request reception and authentication logic 202, analyzer 204, communication/access logic 206, and compatibility logic 208. Resource mechanism 110 further includes additional components, such as processing framework 210 having resource allocation logic 212, auction-based resource sharing logic 232, quorum-based broker health logic 252, workload scheduling routing logic 262, and sliding window maintenance logic 272.

It is contemplated that any number and type of components may be added to and/or removed from resource mechanism 110 to facilitate various embodiments including adding, removing, and/or enhancing certain features. For brevity, clarity, and ease of understanding of resource mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

In some embodiments, resource mechanism 110 may be in communication with database 280 to store data, metadata, tables, reports, etc., relating to messaging queues, etc.

Resource mechanism 110 may be further in communication with any number and type of client computing devices, such as client computing device 290 over network 285. Throughout this document, the term "logic" may be interchangeably referred to as "framework" or "component" or "module" and may include, by way of example, software, hardware, and/or any combination of software and hardware, such as firmware. This combination of components provided through resource mechanism 110 facilitates user-based control and manipulation of particular data products/software applications (e.g., social websites, business websites, word processing, spreadsheets, database products, etc.) to be manipulated, shared, communicated, and displayed in any number and type of formats as desired or necessitated by user and communicated through user interface 294 at client computing device 292 and over network 290.

It is contemplated that a user may include an administrative user or an end-user. An administrative user may include an authorized and/or trained user, such as a system administrator, a software developer, a computer programmer, etc. In contrast, an end-user may be any user that can access a client computing device, such as via a software application or an Internet browser. In one embodiment, a user, via user interface 294 at client computing device 290, may manipulate or request data as well as view the data and any related metadata in a particular format (e.g., table, spreadsheet, etc.) as desired or necessitated by the user. Examples of users may include, but are not limited to, customers (e.g., end-user) or employees (e.g., administrative user) relating to organizations, such as organizational customers (e.g., small and large businesses, companies, corporations, academic institutions, government agencies, non-profit organizations, etc.) of a service provider (e.g., Salesforce.com). It is to be noted that terms like "user", "customer", "organization", "tenant", "business", "company", etc., may be used interchangeably throughout this document.

In one embodiment, resource mechanism 110 may be employed at a server computing system, such as computing device 100 of FIG. 1, and may be in communication with one or more client computing devices, such as client computing device 290, over a network, such as network 285 (e.g., a cloud-based network, the Internet, etc.). As aforementioned, a user may include an organization or organizational customer, such as a company, a business, etc., that is a customer to a provider (e.g., Salesforce.com®) that provides access to resource mechanism 110 (such as via client computer 290). Similarly, a user may further include an individual or a small business, etc., that is a customer of the organization/organizational customer and accesses resource mechanism 110 via another client computing device. Client computing device 290 may be the same as or similar to computing device 100 of FIG. 1 and include a mobile computing device (e.g., smartphones, tablet computers, etc.) or larger computers (e.g., desktop computers, server computers, etc.).

In one embodiment, resource mechanism 110 facilitates fair and efficient management of message routing and queues for efficient management of system resources, such as application servers, etc., and providing better customer service, where the users may accessing these services via user interface 294 provided through any number and type of software applications (e.g., websites, etc.) employing social and business networking products, such as Chatter® by Salesforce.com, Facebook®, LinkedIn®, etc.

In one embodiment, request reception and authentication logic 202 may be used to receive a request (e.g., print a document, move a document, merge documents, run a report, display data, etc.) placed by a user via client computing device 290 over network 285. Further, request reception and authentication logic 202 may be used to authenticate the received request as well as to authenticate the user (and/or the corresponding customer) and/or computing device 290 before the user is allowed to place the request. It is contemplated that in some embodiments, the authentication process may be a one-time process conducted when computing device 290 is first allowed access to resource mechanism 110 or, in some embodiments, authentication may be a recurring process that is performed each time a request is received by request reception and authentication logic 202 at resource mechanism 110 at the cloud-based server computing device via network 285.

Once the authentication process is concluded, the request is sent to analyzer 204 to analysis and based on the results of the analysis, the request is forwarded on to processing framework 210 for proper processing by one or more components 212, 232, 252, 262, 272 and their sub-components. Communication/access logic 206 facilitates communication between the server computing device hosting resource mechanism 110 and other computing devices including computing device 290 and other client computing devices (capable of being accessed by any number of users/customers) as well as other server computing devices. Compatibility logic 208 facilitates dynamic compatibility between computing devices (e.g., computing device 290), networks (e.g., network 285), any number and type of software packages (e.g., websites, social networking sites, etc.).

Window logic 272 provides a sliding window framework for tracking resource utilization in message queues that allows for improved real-time reporting and traffic analysis. Using this resource tracking framework, more responsive monitoring tools are employed providing self-managing throttling and scheduling algorithms to address and eliminate message starvation. Window logic 272 facilitates usage estimation (e.g., thread time consumed or waiting times by organization or message type, etc.) and resource tracking at a much smaller granularity (e.g., per organization and per message type) and finer time scale (e.g., 5 minute intervals). This technique may be used to determine: 1) the amount of resources an organization consumed during a time period, such as past 10 minutes; and, 2) the estimated completion time of an organization's messages given the current rate of processing.

In one embodiment, window logic 272 includes in-flight job monitor ("monitor") 276 for usage tracking and estimation module to track and estimate resource usage relating to each application server, such as by measuring the thread time used by each application server and/or by simply reading a report on measured thread time and queuing time of each message processed by an application server. The report may be obtained from mem-cache 287 where it may be stored by the application server once it is prepared by it. These measurements may be aggregated, by memcached-based sliding window resource utilization aggregator ("aggregator") 276, across the entire POD and grouped by time intervals, such as 5 minute time intervals, in a sliding window manner. Aggregator 276 may further track a number of unique organization and message type combinations that are encountered at each application server as well as provide a novel solution for tracking threads of long running (e.g., hours or even days) messages, also in mem-cache 287 which includes tenant and job type history ("history") 289 to store the relevant data and metadata.

Embodiments provide a novel mechanism to track thread usage in order to support fair scheduling of tasks from competing message types and organizations. In one embodiment, using window logic 272, the following statistics may be tracked: 1) thread time (also referred to as "wall clock time") for each message type and organization combination, which is the amount of time spent executing the handler for messages of a given type and the corresponding organization; 2) time spent waiting on the queue for each message type and organization combination, which estimates how much time messages of a given type and organization spent waiting to be dequeued and processed; 3) a number of messages processed for each message type and organization combination; 4) a list of distinct organization and message type combinations whose messages are still waiting on the queue; and 5) a list of long-running, in-flight messages that have yet to completed. In one embodiment, an estimation of these measures may be sufficient for fair scheduling and upon scaling reliably and aggregating these measurements over a defined time period, such as 5 minutes intervals, the measurements may be stored at mem-cache 287, serving as a transient storage, for subsequent use and consumption. The statistics may be aggregated across the entire POD (e.g., all application servers participating in the message queue dequeue cluster) and grouped into time windows (e.g., 5 minute time windows) over a rolling time span, such as 30 minute rolling span of time, where aggregation over the entire POD may include one or more of sum, maximum, minimum, and set union operations.

In one embodiment, metering may be used to complement workload logic 272 to aggregating across app servers, bucketing statistics by time interval, and persisting in mem-cache 287, etc., and further to track dequeue latency, thread time, and number of messages processed on a per organization, per message type basis using metering, etc. Further, bucketing time may be done in 5 minute intervals and the statistics are aggregated within each interval, where metering may be extended with support for minimum/maximum aggregation.

In one embodiment, long-running tracker 278 may be used to track long-running messages (e.g., tens of minutes to hours long) that span multiple time intervals, such as multiple 5 minute time intervals. To account for any potential underestimation of thread time, this, a list of in-flight messages that have been running for more than 30 seconds may be tracked. Periodically, application servers may report a list of in-flight messages that have been running for longer than a defined period of time, such as 30 seconds, to mem-cache 287. This list may be bounded by a number of database nodes and once a long-running message completes, the corresponding message is removed from the list in mem-cache 287. A cluster or node combination refers to a consolidation of multiple databases ("database node" or simply "node"), such as Real Application Cluster (RAC®) node by Oracle®. A RAC may provide a database technology for scaling databases, where a RAC node may include a database computing host that processes database queries from various worker hosts. Further, the list of in-flight messages may be partitioned by application server identifiers to avoid contention and merge the list of messages from all applications servers upon read.

Figure 3:
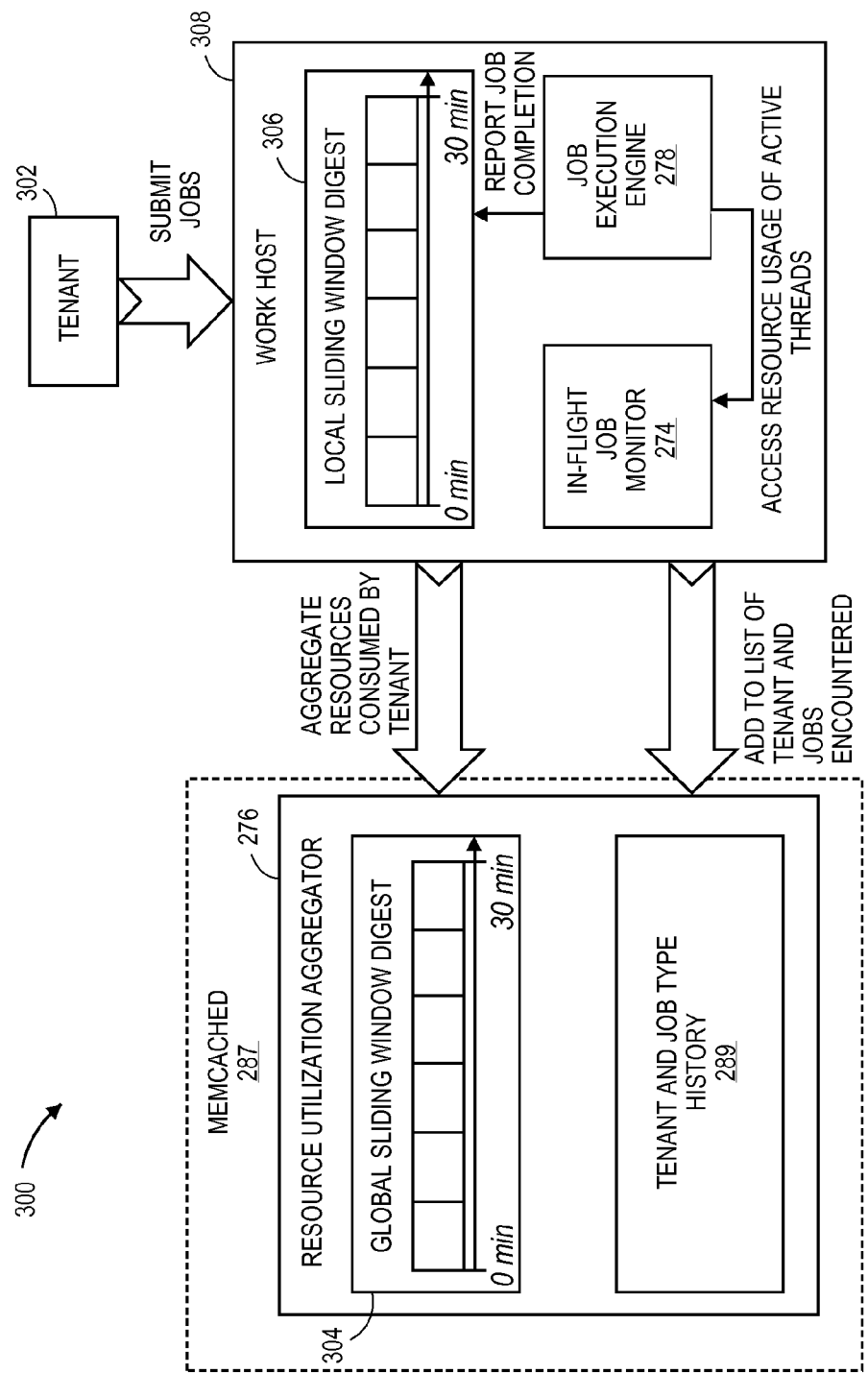
FIG. 3 illustrates an architecture for facilitating sliding window resource tracking in message queues for fair management of resources for application servers in a multi-tenant environment in an on-demand services environment according to one embodiment.

In one embodiment, using aggregator 276, tracking resource utilization may include sliding window, such as a global sliding window digest ("global digest") 304 of FIG. 3, to segment time into fixed time windows, such as fixed 5 minute windows or intervals, such that, for example, the relevant statistics reported by each application server are aggregated and tallied within the same five minute window. Further, a look-back period is maintained to have sufficient data or statistics in history 289 at mem-cache 287 to provide, for example, a 30-minute look-back interval (or at most 7 windows) on which to base fair usage scheduling decisions.

Monitor 274 continues to monitor and track thread time when the handler is first called for a message and on handler completion, the elapsed time is tallied and reported to history 289. Each thread time is tagged with a combination of organization and message types and the current time window. The thread time may then be summed for all messages from the same organization/message type combination while the intermediate sum may be cached locally. Every minute (e.g., configurable), the local sum may be flushed to history 289 at mem-cache 287 by adding the global sum (e.g., aggregated from all application servers) with the local sum. Thus, mem-cache 287 may be maintained for each organization/message type combination, where a value may denote the sum of thread time over all application servers. Similar to thread time, a number of messages may be tracked and processed per organization/message type combination for each window; for example, a message may be counted during the time window in which it completes processing.

In one embodiment, fair usage may be based on two inputs for each organization/message type combination, including: 1) an amount of thread time consumed; and 2) a length of time messages have been waiting in the queue. The latter may be using a combination of longest waiters (for messages that have been starved for a long time) and dequeue latency of each message dequeued (for messages that are processed quickly). Longest waiters are determined by querying the broker for the oldest messages on each queue. Here, estimating queuing time for messages may be obtained that may not show up on the longest waiters list (e.g., if longest waiters are queried for every 5 minutes but each message wait, on average, less than 1 minute on the queue before being processed).

Tracking Unique Organization/Message Type Combinations

In one embodiment, unique organization/message type combinations that are encountered during each 5 minute interval are tracked using monitor 274 and aggregator 276 by appending to existing set, read and merge sets, and periodic flushing, etc., where the aggregated data corresponding to each application server, merged lists, etc., are provided to and stored at history 289.

Tracking Long-Running In-Flight Messages

In some embodiments, a reporting period is employed, where after a defined period of time (e.g., every 30 seconds), a thread on an application iterates through a list of in-flight messages such that those messages that have been running for longer than 30 seconds are found and reported to history 289 with a cache key consisting of the app server and thread identifiers. Each item may include organization type, message type, and message start time, etc., and this list may be bounded to, for example, a maximum of two messages per rac node. Tracking of long-running in-flight message is performed by monitor 274 and may further include updating the list such that once a long running message completes, any reference to the message is removed from the corresponding list in history 289 by overwriting (e.g., asynchronously) the existing list. Tracking further includes reading and merging lists, where a read method (which takes as input a list of all application servers in the dequeue cluster) merges the list of in-flight messages from various application servers and return a list consisting of all long-running messages across the entire POD. In tracking, due to a delay in updating in-flight messages in history 289, the thread time may be underestimated or overestimated for a given organization/message type combination, because a race may occur between reading from and writing to the in-flight messages and the thread time from metering. Thus, in one embodiment, to alleviate this issue, only long-running (>30 seconds) in-flight messages may be tracked such that a vast majority of messages may not be double counted.

Since message queue traffic is partitioned by rac node, tracked and gathered statistics or data may also be partitioned by rac node and every statistic is associated with an organization such that no special handling is necessitated during tracking and that whenever the statistics is read from history 289 to compute fair usage, each value may be grouped by rac node. To reduce unnecessary potential overhead, a threshold is defined within which statistics tracking is triggered; for example, with a 5 minute threshold, tracking may not be triggered and statistics may not be reported until a queue experiences a dequeue latency of 5 minutes or more. This threshold allows prevention of unnecessary overhead when fair usage may not be required (e.g., when there are minimal delays in the queue) or shutting off statistics tracking entirely (e.g., using a high threshold).

The example of illustrating the use of technology disclosed herein should not be taken as limiting or preferred. This example sufficiently illustrates the technology disclosed without being overly complicated. It is not intended to illustrate all of the technologies disclose.

A person having ordinary skill in the art will appreciate that there are many potential applications for one or more implementations of this disclosure and hence, the implementations disclosed herein are not intended to limit this disclosure in any fashion.

FIG. 3 illustrates an architecture 300 for facilitating sliding window resource tracking in message queues for fair management of resources for application servers in a multi-tenant environment in an on-demand services environment according to one embodiment. It is to be noted that for brevity and ease of understanding, most of the processes and components described with reference to FIGS. 1 and 2 are not repeated here with respect to FIG. 3 or with reference to any of the subsequent figures. In one embodiment, architecture 300 includes a memcached distribution cache 287 in communication with worker host 308 which is in communication with tenant 302 that includes an organization and places a job request with worker host 308 via a user interface (e.g., user interface 294 of FIG. 2) using a client computing device (e.g., client computing device 290 of FIG. 2). A worker host may include or be associated with an application server and may include or be associated with a server computing device serving as a host machine, such as host machine 100 (hosting resource mechanism 110) of FIG. 1.

In one embodiment and as illustrated, tenant 302 submits job requests for performance of jobs with worker host 308. This triggers a local sliding window digest 306 to perform sliding window technique-based analysis of the requested job placed by tenant 302 and determine the amount of resources available to or consumed by tenant 302, etc. Worker host 308 maintains communication with resource utilization aggregator 276, facilitating global sliding window digest 304, to exchange the information relating to the overall or global resource availability/consumption as well as local resource availability/consumption relating to this tenant 302. As aforementioned, much of the global and local resource availability/consumption information may be stored at history 289 so that it remains accessible for use by global and local digests 304, 306 for determination of resource availability and consumption and the fair allocation of available resources to various tenants, including tenant 302.

Further, in one embodiment, based on both the in-flight thread/resource information as monitored and tracked by monitor 274 and other thread/resource information stored at history 289, fair allocation of resources is performed, including setting aside sufficient resources for performing one or more jobs requested by tenant 302. The requested jobs are performed by job execution engine 278 and any information relating to resource usage of active threads is communicated to monitor 274 and further forwarded on to history 289.

Figure 4A:
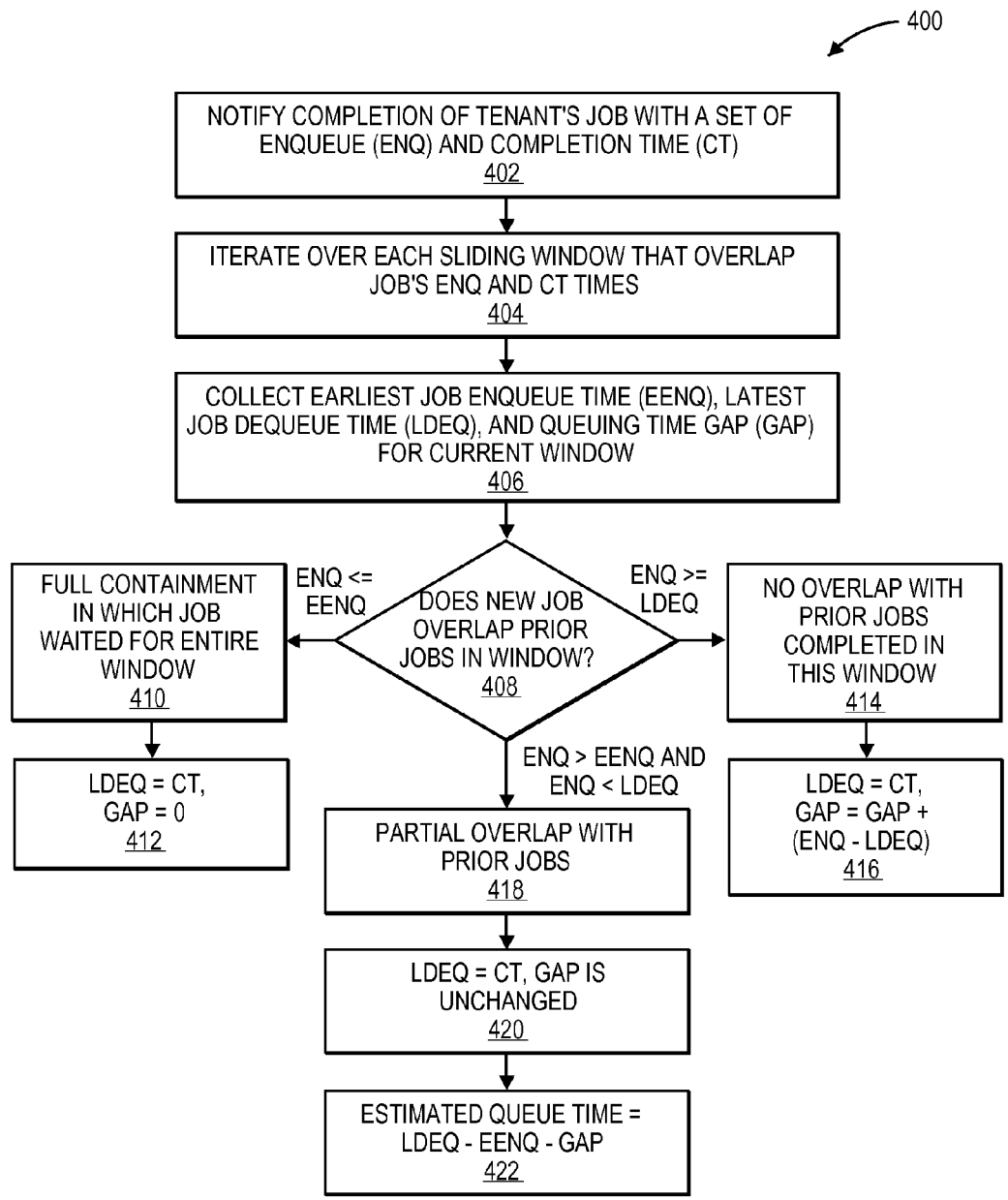
FIG. 4A illustrates a method for facilitating sliding window resource tracking in message queues for fair management of resources for application servers in a multi-tenant environment in an on-demand services environment according to one embodiment.

FIG. 4A illustrates a method 400 for facilitating sliding window resource tracking in message queues for fair management of resources for application servers in a multi-tenant environment in an on-demand services environment according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by thread resource management mechanism 110 of FIG. 1.

Method 400 described a process relating to estimating queue time by tenant involving window logic 272 of FIG. 2. Method 400 begins at block 402 with notification of completion of a tenant's job with a set of enqueue ("ENQ") and completion time ("CT") and the process continues with iterating over each sliding window that overlaps the job's ENQ and CT at block 404. At block 406, the earliest job enqueue time ("EENQ"), the last job dequeue time ("LDEQ"), and the queuing time gap ("GAP") for a current window is collected. At 408, a determination is made as to whether the new job overlaps any of the prior jobs in the window. If ENQ is less than or equal to EENQ, at block 410, a full containment is performed for the queue where the job waited for an entire window, where LDEQ equals CT, and GAP equals zero at block 412.

Referring back to block 408, if ENQ is greater than EENQ, and ENQ is less than LDEQ, the partial overlap with one or more prior jobs is detected at block 418, where LDEQ equals CT, and GAP remains unchanged at block 420, and the estimated queuing time is determined to be LDEQ−EENQ−GAP at block 422. If ENQ is greater than or equal to LDEQ, no overlap with the prior jobs is completed in this window at block 414, where LDEQ equals CT, and GAP equals GAP+(ENQ−LDEQ).

Figure 4B:
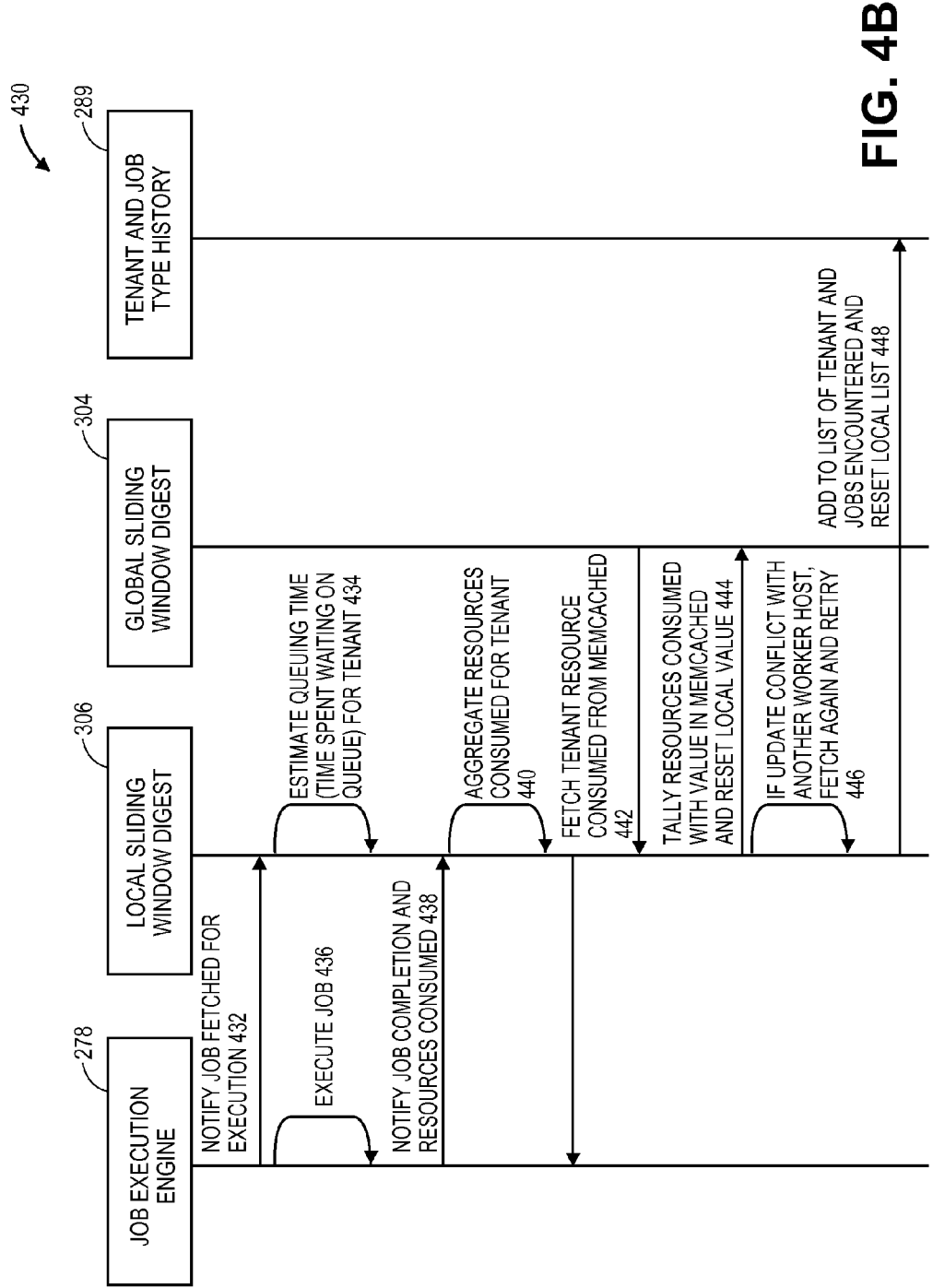
FIG. 4B illustrates a transaction sequence for facilitating sliding window resource tracking in message queues for fair management of resources for application servers in a multi-tenant environment in an on-demand services environment according to one embodiment.

FIG. 4B illustrates a transaction sequence 430 for facilitating sliding window resource tracking in message queues for fair management of resources for application servers in a multi-tenant environment in an on-demand services environment according to one embodiment. Transaction sequence 430 may be performed by processing logic that may comprise hardware (e.g., circuitry, dedicated logic, programmable logic, etc.), software (such as instructions run on a processing device), or a combination thereof. In one embodiment, transaction sequence 430 may be performed by thread resource management mechanism 110 of FIG. 1.

Transaction sequence 430 describes a transaction relating to reporting of resources consumed by a job involving workload logic 262 of FIG. 2. In one embodiment, transaction sequence 430 includes a job execution engine 278 notifying a job fetched for execution 432 to local digest 306 where queuing time (e.g., time spent waiting on queue) for tenant is estimated 434, whereas the job is executed 436 at job execution engine 278. Any information relating to completion of the job and the resources consumed on that completion is notified and provided 438 to local digest 306. The resources consumed for the tenant are aggregated 440 at local digest 306. Any tenant resource consumed as reported from memcached distributed cache are fetched 442 from global digest 304 to local digest 306. The resources consumed are tallied with a value in mem-cache at the global digest 304, and the local digest value is reset 444. If there is a conflict with another worker host when updating the global digest 304, the information is fetched again and updated accordingly and the process is retried 446 at local digest 306. The update and other relevant information is provided to tenant and job type history 289 where it is added to the list of tenant and jobs encountered and the local list is reset 448.

Figure 4C:
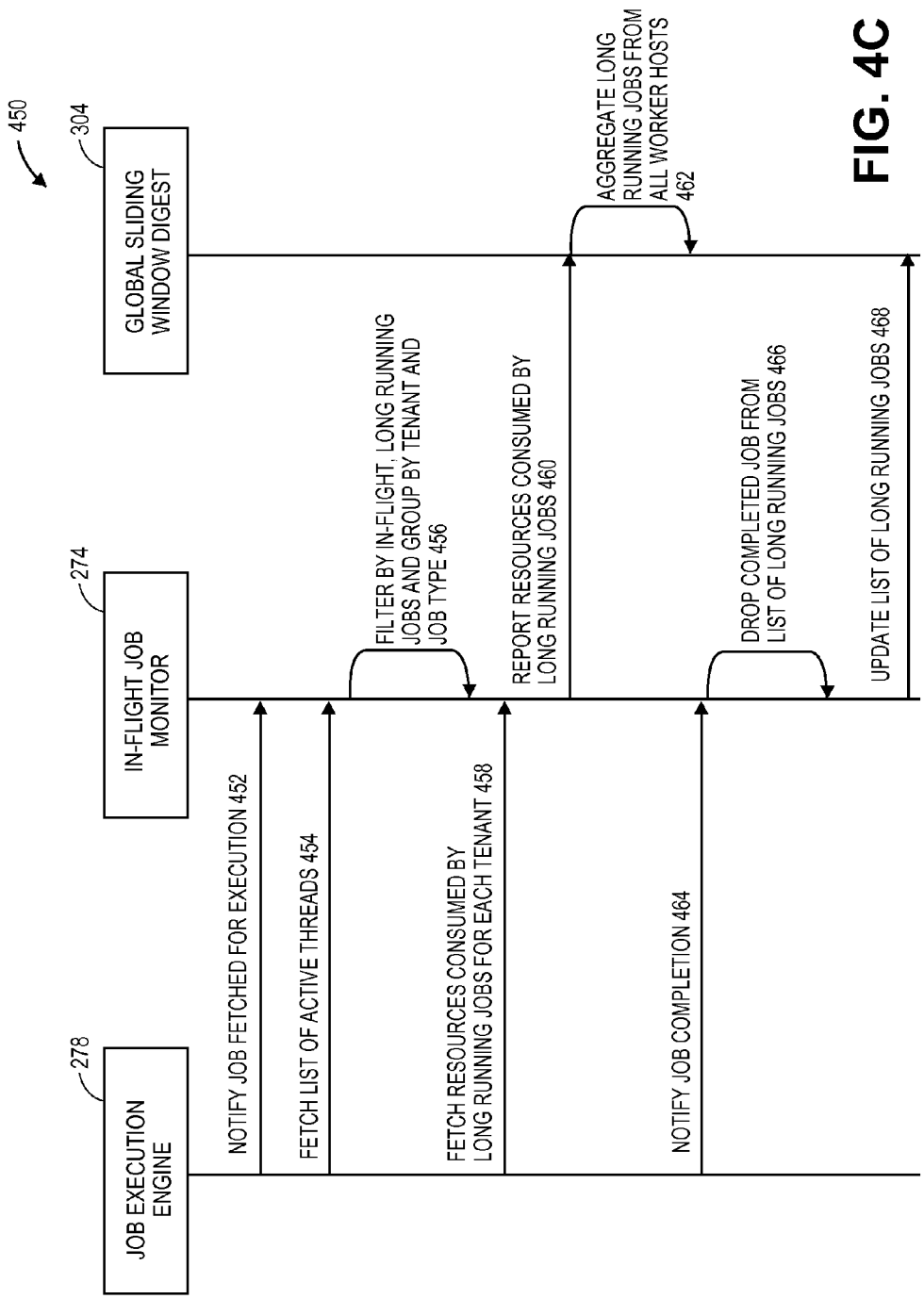
FIG. 4C illustrates a transaction sequence for facilitating sliding window resource tracking in message queues for fair management of resources for application servers in a multi-tenant environment in an on-demand services environment according to one embodiment.

FIG. 4C illustrates a transaction sequence 450 for facilitating sliding window resource tracking in message queues for fair management of resources for application servers in a multi-tenant environment in an on-demand services environment according to one embodiment. Transaction sequence 450 may be performed by processing logic that may comprise hardware (e.g., circuitry, dedicated logic, programmable logic, etc.), software (such as instructions run on a processing device), or a combination thereof. In one embodiment, transaction sequence 450 may be performed by thread resource management mechanism 110 of FIG. 1.

Transaction sequence 430 describes a transaction relating to tracking of in-flight jobs involving in-flight job monitor 274 of workload logic 262 of FIG. 2. In one embodiment, job execution engine 278 provides notification of a job fetched for execution 452 to in-flight job monitor 274 as well as a list of active threads is fetched 454 to monitor 274. At monitor 274, long running, in-flight jobs are filtered by processing time and grouped by tenant and job type 456. A report including information relating to resources consumed by long running jobs is provided 460 to global digest 304. Various long running jobs associated with any number of worker hosts are aggregated 462 at global digest 304. A notification of job completion is provided 464 from job execution engine 278 to monitor 274 where the completed job is dropped from the list of long running jobs 466. An updated list of long running jobs 468 is provided to global digest 304.

Figure 5:
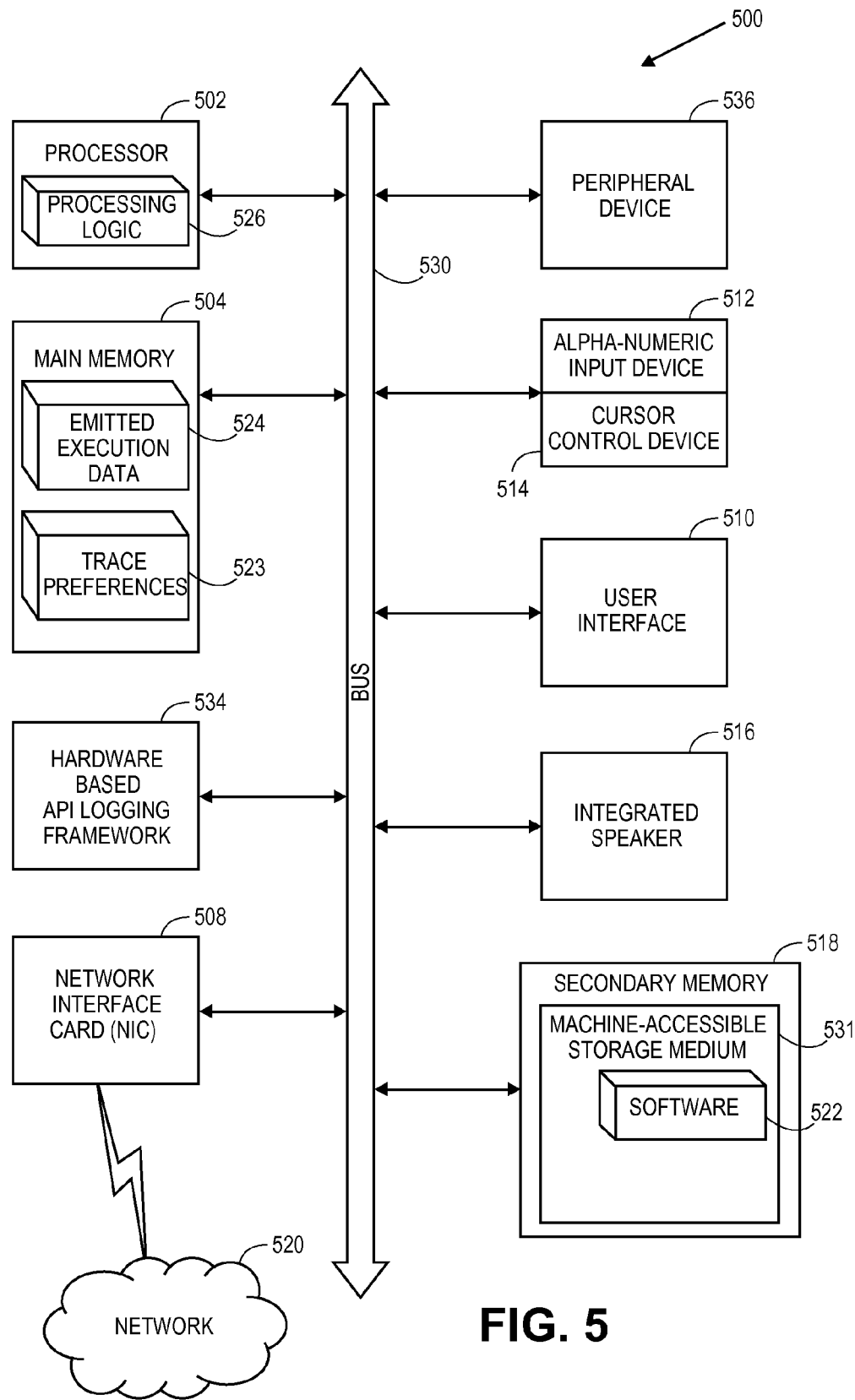
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 290 of FIG. 1 and FIG. 2, respectively. In alternative embodiments, the machine may be connected (e.g., networked) to other machines in a network (such as host machine 100 of FIG. 1 connected with client machine 290 over network 285 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of thread resource management mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of thread resource management mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
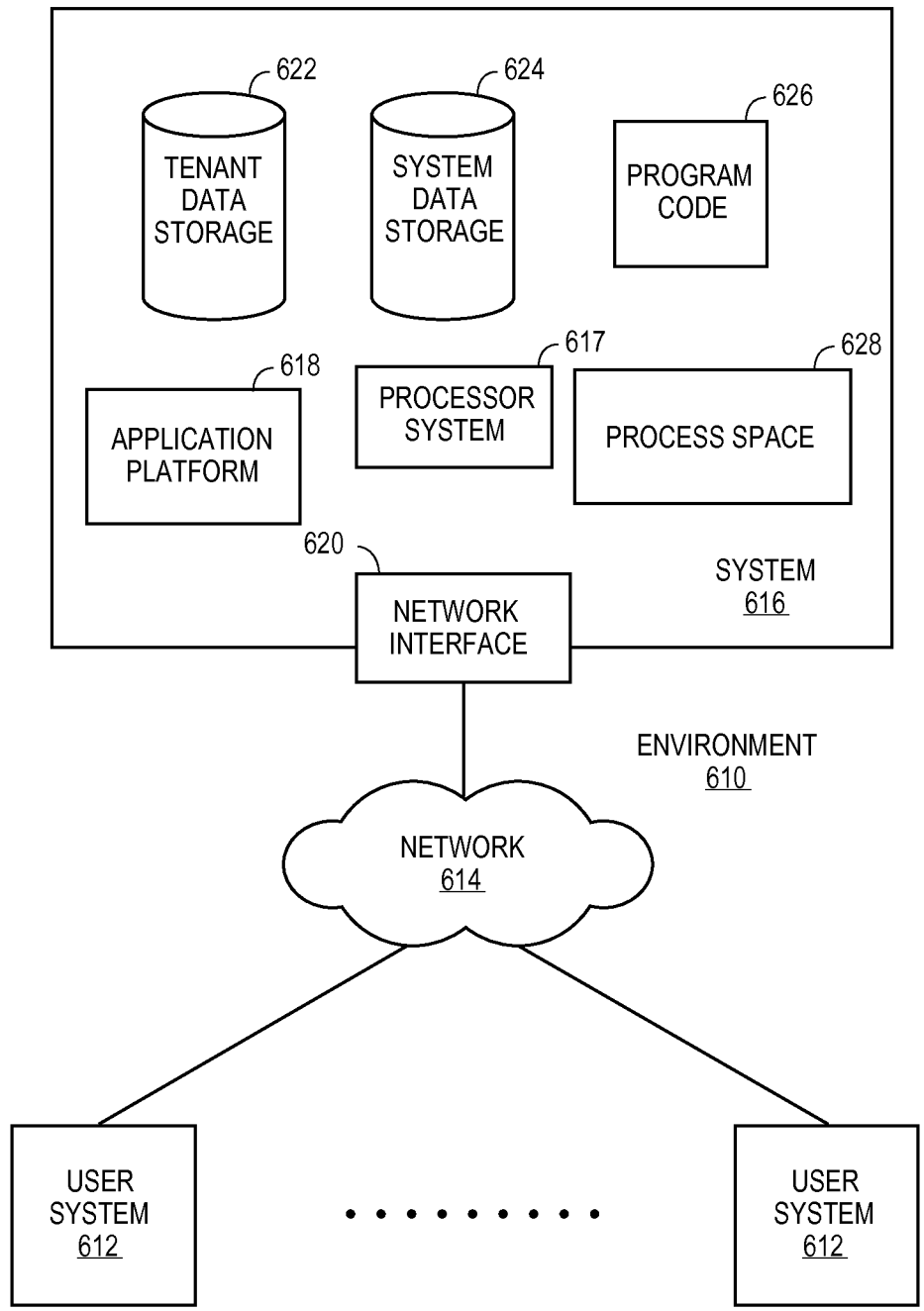
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
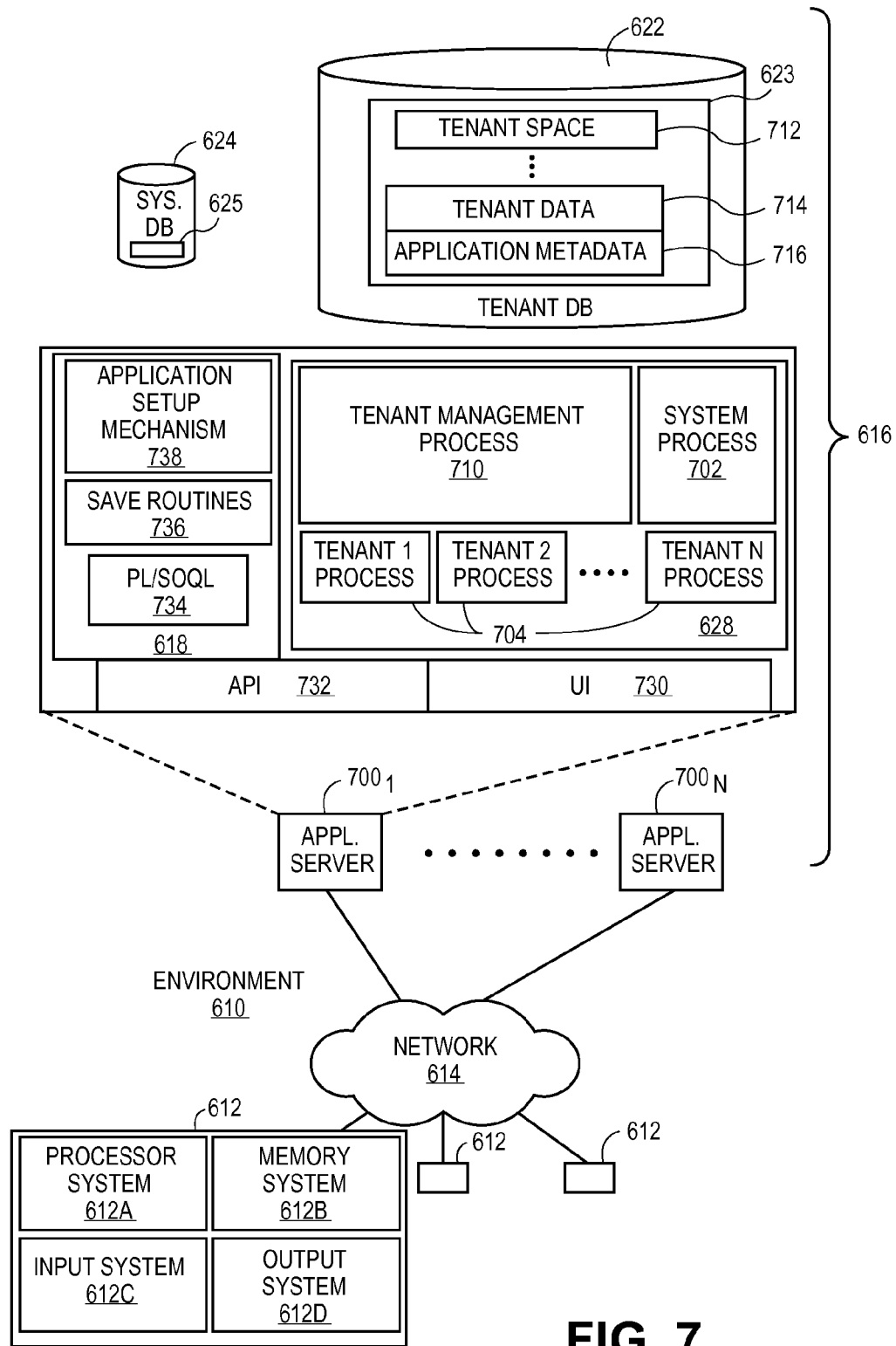
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700₁-700ₙ, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700₁ might be coupled via the network 614 (e.g., the Internet), another application server 700_{N-1} might be coupled via a direct network link, and another application server 700ₙ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method comprising:
monitoring, in real-time, by the database system, time usage associated with a plurality of job types in message queues, wherein the plurality of job types are requested by a plurality of tenants in a multi-tenant environment;
predicting, in real-time, by applying a sliding time scale, a segment of time of the time usage relating to a job type in a message queue, wherein the segment of time includes an expected wait time for the job type in the message queue and an expected execution time to complete the job type;
allocating, in real-time, based on the segment of time, a set of thread resources to the job type associated with a tenant, wherein allocating further includes enforcing equitable distribution of the thread resources to other job types of the plurality of job types associated with other tenants of the plurality of tenants; and
delaying, in real-time, based on the segment of time, the allocation of the set of thread resources to the job type to allow the set of thread resources to continue to be used by an existing job type or preserving the set of thread resources for a later use by the job type or one or more of the plurality of job types.

2. The method of claim 1, wherein allocating comprises relinquishing one or more of the set of thread resources from the job type, and offering the relinquished one or more of the set of thread resources to another job type associated with another tenant.

3. The method of claim 1, further comprising denying, in real-time, based on the segment of time, the allocation of the set of thread resources to the job type.

4. The method of claim 1, further comprising communicating the expected wait time or the expected execution time to a resource aggregator at a history cache.

5. The method of claim 4, wherein the sliding time scale is further to determine conflicts between the job type and the in-flight job types, and
wherein the method further comprises aggregating historical consumption of the thread resources into groups including one or more of a first group of resources historically consumed by the job type, a second group of resources historically consumed by the tenant, and a third group of resources historically consumed by long-running job types of the in-flight job types.

6. The method of claim 5, wherein if a conflict exists, the history cache is updated accordingly to facilitate continuous fair allocation of the thread resources.

7. A system comprising:
a computing device having a memory to store instructions, and a processing device to execute the instructions, the computing device further having a mechanism to:
monitor, in real-time, by the database system, time usage associated with a plurality of job types in message queues, wherein the plurality of job types are requested by a plurality of tenants in a multi-tenant environment;
predict, in real-time, by applying a sliding time scale, a segment of time of the time usage relating to a job type in a message queue, wherein the segment of time includes an expected wait time for the job type in the message queue and an expected execution time to complete the job type;
allocate, in real-time, based on the segment of time, a set of thread resources to the job type associated with a tenant, wherein allocating further includes enforcing equitable distribution of the thread resources to other job types of the plurality of job types associated with other tenants of the plurality of tenants; and
delay, in real-time, based on the segment of time, the allocation of the set of thread resources to the job type to allow the set of thread resources to continue to be used by an existing job type or preserving the set of thread resources for a later use by the job type or one or more of the plurality of job types.

8. The system of claim 7, wherein allocating comprises relinquishing one or more of the set of thread resources from the job type, and offering the relinquished one or more of the set of thread resources to another job type associated with another tenant.

9. The system of claim 7, wherein the mechanism is further to deny, in real-time, based on the segment of time, the allocation of the set of thread resources to the job type.

10. The system of claim 7, wherein the mechanism is further to communicate the expected wait time or the expected execution time to a resource aggregator at a history cache.

11. The system of claim 10, wherein the sliding time scale is further to determine conflicts between the job type and the in-flight job types, and
wherein the mechanism is further to aggregate historical consumption of the thread resources into groups including one or more of a first group of resources historically consumed by the job type, a second group of resources historically consumed by the tenant, and a third group of resources historically consumed by long-running job types of the in-flight job types.

12. The system of claim 11, wherein if a conflict exists, the history cache is updated accordingly to facilitate continuous fair allocation of the thread resources.

13. A non-transitory machine-readable medium having stored thereon instructions which, when executed by a machine, cause the machine to perform one or more operations comprising:
monitoring, in real-time, by the database system, time usage associated with a plurality of job types in message queues, wherein the plurality of job types are requested by a plurality of tenants in a multi-tenant environment;
predicting, in real-time, by applying a sliding time scale, a segment of time of the time usage relating to a job type in a message queue, wherein the segment of time includes an expected wait time for the job type in the message queue and an expected execution time to complete the job type;
allocating, in real-time, based on the segment of time, a set of thread resources to the job type associated with a tenant, wherein allocating further includes enforcing equitable distribution of the thread resources to other job types of the plurality of job types associated with other tenants of the plurality of tenants; and
delaying, in real-time, based on the segment of time, the allocation of the set of thread resources to the job type to allow the set of thread resources to continue to be used by an existing job type or preserving the set of thread resources for a later use by the job type or one or more of the plurality of job types.

14. The non-transitory machine-readable medium of claim 13, wherein allocating comprises relinquishing one or more of the set of thread resources from the job type, and offering the relinquished one or more of the set of thread resources to another job type associated with another tenant.

15. The non-transitory machine-readable medium of claim 13, wherein the one or more operations further comprise denying, in real-time, based on the segment of time, the allocation of the set of thread resources to the job type.

16. The non-transitory machine-readable medium of claim 13, wherein the one or more operations further comprise communicating the expected wait time or the expected execution time to a resource aggregator at a history cache.

17. The non-transitory machine-readable medium of claim 16, wherein the sliding time scale is further to determine conflicts between the job type and the in-flight job types, and
wherein the one or more operations further comprise aggregating historical consumption of the thread resources into groups including one or more of a first group of resources historically consumed by the job type, a second group of resources historically consumed by the tenant, and a third group of resources historically consumed by long-running job types of the in-flight job types.

18. The non-transitory machine-readable medium of claim 17, wherein if a conflict exists, the history cache is updated accordingly to facilitate continuous fair allocation of the thread resources.

19. A database system-implemented method comprising:
monitoring, in real-time, by the database system, time usage associated with a plurality of job types in message queues, wherein the plurality of job types are requested by a plurality of tenants in a multi-tenant environment;
predicting, in real-time, by applying a sliding time scale, a segment of time of the time usage relating to a job type in a message queue, wherein the segment of time includes an expected wait time for the job type in the message queue and an expected execution time to complete the job type;
allocating, in real-time, based on the segment of time, a set of thread resources to the job type associated with a tenant, wherein allocating further includes enforcing equitable distribution of the thread resources to other job types of the plurality of job types associated with other tenants of the plurality of tenants, wherein allocating comprises relinquishing one or more of the set of thread resources from the job type, and offering the relinquished one or more of the set of thread resources to another job type associated with another tenant; and
denying, in real-time, based on the segment of time, the allocation of the set of thread resources to the job type.

20. The method of claim 19, further comprising delaying, in real-time, based on the segment of time, the allocation of the set of thread resources to the job type to allow the set of thread resources to continue to be used by an existing job type or preserving the set of thread resources for a later use by the job type or one or more of the plurality of job types.

21. The method of claim 19, further comprising communicating the expected wait time or the expected execution time to a resource aggregator at a history cache.

22. The method of claim 21, wherein the sliding time scale is further to determine conflicts between the job type and the in-flight job types, and
wherein the method further comprises aggregating historical consumption of the thread resources into groups including one or more of a first group of resources historically consumed by the job type, a second group of resources historically consumed by the tenant, and a third group of resources historically consumed by long-running job types of the in-flight job types.

23. The method of claim 22, wherein if a conflict exists, the history cache is updated accordingly to facilitate continuous fair allocation of the thread resources.

24. A system comprising:
a computing device having a memory to store instructions, and a processing device to execute the instructions, the computing device further having a mechanism to:
monitor, in real-time, by the database system, time usage associated with a plurality of job types in message queues, wherein the plurality of job types are requested by a plurality of tenants in a multi-tenant environment;
predict, in real-time, by applying a sliding time scale, a segment of time of the time usage relating to a job type in a message queue, wherein the segment of time includes an expected wait time for the job type in the message queue and an expected execution time to complete the job type;
allocate, in real-time, based on the segment of time, a set of thread resources to the job type associated with a tenant, wherein allocating further includes enforcing equitable distribution of the thread resources to other job types of the plurality of job types associated with other tenants of the plurality of tenants, wherein allocating comprises relinquishing one or more of the set of thread resources from the job type, and offering the relinquished one or more of the set of thread resources to another job type associated with another tenant; and
deny, in real-time, based on the segment of time, the allocation of the set of thread resources to the job type.

25. The system of claim 24, wherein the mechanism is further to delay, in real-time, based on the segment of time, the allocation of the set of thread resources to the job type to allow the set of thread resources to continue to be used by an existing job type or preserving the set of thread resources for a later use by the job type or one or more of the plurality of job types.

26. The system of claim 24, wherein the mechanism is further to communicate the expected wait time or the expected execution time to a resource aggregator at a history cache.

27. The system of claim 26, wherein the sliding time scale is further to determine conflicts between the job type and the in-flight job types, and
wherein the mechanism is further to aggregate historical consumption of the thread resources into groups including one or more of a first group of resources historically consumed by the job type, a second group of resources historically consumed by the tenant, and a third group of resources historically consumed by long-running job types of the in-flight job types.

28. The system of claim 27, wherein if a conflict exists, the history cache is updated accordingly to facilitate continuous fair allocation of the thread resources.

29. A non-transitory machine-readable medium having stored thereon instructions which, when executed by a machine, cause the machine to perform one or more operations comprising:
monitoring, in real-time, by the database system, time usage associated with a plurality of job types in message queues, wherein the plurality of job types are requested by a plurality of tenants in a multi-tenant environment;
predicting, in real-time, by applying a sliding time scale, a segment of time of the time usage relating to a job type in a message queue, wherein the segment of time includes an expected wait time for the job type in the message queue and an expected execution time to complete the job type;
allocating, in real-time, based on the segment of time, a set of thread resources to the job type associated with a tenant, wherein allocating further includes enforcing equitable distribution of the thread resources to other job types of the plurality of job types associated with other tenants of the plurality of tenants, wherein allocating comprises relinquishing one or more of the set of thread resources from the job type, and offering the relinquished one or more of the set of thread resources to another job type associated with another tenant; and denying, in real-time, based on the segment of time, the allocation of the set of thread resources to the job type.

30. The non-transitory machine-readable medium of claim 29, wherein the one or more operations further comprise delaying, in real-time, based on the segment of time, the allocation of the set of thread resources to the job type to allow the set of thread resources to continue to be used by an existing job type or preserving the set of thread resources for a later use by the job type or one or more of the plurality of job types.

31. The non-transitory machine-readable medium of claim 29, wherein the one or more operations further comprise communicating the expected wait time or the expected execution time to a resource aggregator at a history cache.

32. The non-transitory machine-readable medium of claim 31, wherein the sliding time scale is further to determine conflicts between the job type and the in-flight job types, and wherein the one or more operations further comprise aggregating historical consumption of the thread resources into groups including one or more of a first group of resources historically consumed by the job type, a second group of resources historically consumed by the tenant, and a third group of resources historically consumed by long-running job types of the in-flight job types.

33. The non-transitory machine-readable medium of claim 32, wherein if a conflict exists, the history cache is updated accordingly to facilitate continuous fair allocation of the thread resources.

34. A database system-implemented method comprising:
monitoring, in real-time, by the database system, time usage associated with a plurality of job types in message queues, wherein the plurality of job types are requested by a plurality of tenants in a multi-tenant environment;
predicting, in real-time, by applying a sliding time scale, a segment of time of the time usage relating to a job type in a message queue, wherein the segment of time includes an expected wait time for the job type in the message queue and an expected execution time to complete the job type;
allocating, in real-time, based on the segment of time, a set of thread resources to the job type associated with a tenant, wherein allocating further includes enforcing equitable distribution of the thread resources to other job types of the plurality of job types associated with other tenants of the plurality of tenants; and
communicating the expected wait time or the expected execution time to a resource aggregator at a history cache, wherein the sliding time scale is further to determine conflicts between the job type and the in-flight job types based on information from history cache.

35. The method of claim 34, wherein allocating comprises relinquishing one or more of the set of thread resources from the job type, and offering the relinquished one or more of the set of thread resources to another job type associated with another tenant.

36. The method of claim 34, further comprising denying, in real-time, based on the segment of time, the allocation of the set of thread resources to the job type.

37. The method of claim 34, further comprising delaying, in real-time, based on the segment of time, the allocation of the set of thread resources to the job type to allow the set of thread resources to continue to be used by an existing job type or preserving the set of thread resources for a later use by the job type or one or more of the plurality of job types.

38. The method of claim 37, wherein the method further comprises aggregating historical consumption of the thread resources into groups including one or more of a first group of resources historically consumed by the job type, a second group of resources historically consumed by the tenant, and a third group of resources historically consumed by long-running job types of the in-flight job types.

39. The method of claim 38, wherein if a conflict exists, the history cache is updated accordingly to facilitate continuous fair allocation of the thread resources.

40. A system comprising:
a computing device having a memory to store instructions, and a processing device to execute the instructions, the computing device further having a mechanism to:
monitor, in real-time, by the database system, time usage associated with a plurality of job types in message queues, wherein the plurality of job types are requested by a plurality of tenants in a multi-tenant environment;
predict, in real-time, by applying a sliding time scale, a segment of time of the time usage relating to a job type in a message queue, wherein the segment of time includes an expected wait time for the job type in the message queue and an expected execution time to complete the job type;
allocate, in real-time, based on the segment of time, a set of thread resources to the job type associated with a tenant, wherein allocating further includes enforcing equitable distribution of the thread resources to other job types of the plurality of job types associated with other tenants of the plurality of tenants; and
communicating the expected wait time or the expected execution time to a resource aggregator at a history cache, wherein the sliding time scale is further to determine conflicts between the job type and the in-flight job types based on information from history cache.

41. The system of claim 40, wherein allocating comprises relinquishing one or more of the set of thread resources from the job type, and offering the relinquished one or more of the set of thread resources to another job type associated with another tenant.

42. The system of claim 40, wherein the mechanism is further to deny, in real-time, based on the segment of time, the allocation of the set of thread resources to the job type.

43. The system of claim 40, wherein the mechanism is further to delay, in real-time, based on the segment of time, the allocation of the set of thread resources to the job type to allow the set of thread resources to continue to be used by an existing job type or preserving the set of thread resources for a later use by the job type or one or more of the plurality of job types.

44. The system of claim 43, wherein the mechanism is further to aggregate historical consumption of the thread resources into groups including one or more of a first group of resources historically consumed by the job type, a second group of resources historically consumed by the tenant, and a third group of resources historically consumed by long-running job types of the in-flight job types.

45. The system of claim 44, wherein if a conflict exists, the history cache is updated accordingly to facilitate continuous fair allocation of the thread resources.

46. A non-transitory machine-readable medium having stored thereon instructions which, when executed by a machine, cause the machine to perform one or more operations comprising:
- monitoring, in real-time, by the database system, time usage associated with a plurality of job types in message queues, wherein the plurality of job types are requested by a plurality of tenants in a multi-tenant environment;
- predicting, in real-time, by applying a sliding time scale, a segment of time of the time usage relating to a job type in a message queue, wherein the segment of time includes an expected wait time for the job type in the message queue and an expected execution time to complete the job type;
- allocating, in real-time, based on the segment of time, a set of thread resources to the job type associated with a tenant, wherein allocating further includes enforcing equitable distribution of the thread resources to other job types of the plurality of job types associated with other tenants of the plurality of tenants; and
- communicating the expected wait time or the expected execution time to a resource aggregator at a history cache, wherein the sliding time scale is further to determine conflicts between the job type and the in-flight job types based on information from history cache.

47. The non-transitory machine-readable medium of claim 46, wherein allocating comprises relinquishing one or more of the set of thread resources from the job type, and offering the relinquished one or more of the set of thread resources to another job type associated with another tenant.

48. The non-transitory machine-readable medium of claim 46, wherein the one or more operations further comprise denying, in real-time, based on the segment of time, the allocation of the set of thread resources to the job type.

49. The non-transitory machine-readable medium of claim 46, wherein the one or more operations further comprise delaying, in real-time, based on the segment of time, the allocation of the set of thread resources to the job type to allow the set of thread resources to continue to be used by an existing job type or preserving the set of thread resources for a later use by the job type or one or more of the plurality of job types.

50. The non-transitory machine-readable medium of claim 49, wherein the one or more operations further comprise aggregating historical consumption of the thread resources into groups including one or more of a first group of resources historically consumed by the job type, a second group of resources historically consumed by the tenant, and a third group of resources historically consumed by long-running job types of the in-flight job types.

51. The non-transitory machine-readable medium of claim 50, wherein if a conflict exists, the history cache is updated accordingly to facilitate continuous fair allocation of the thread resources.

* * * * *